July 9, 1968  D. F. CORSETTE ET AL  3,391,647
LIQUID DISPENSING PUMP
Filed Jan. 30, 1967
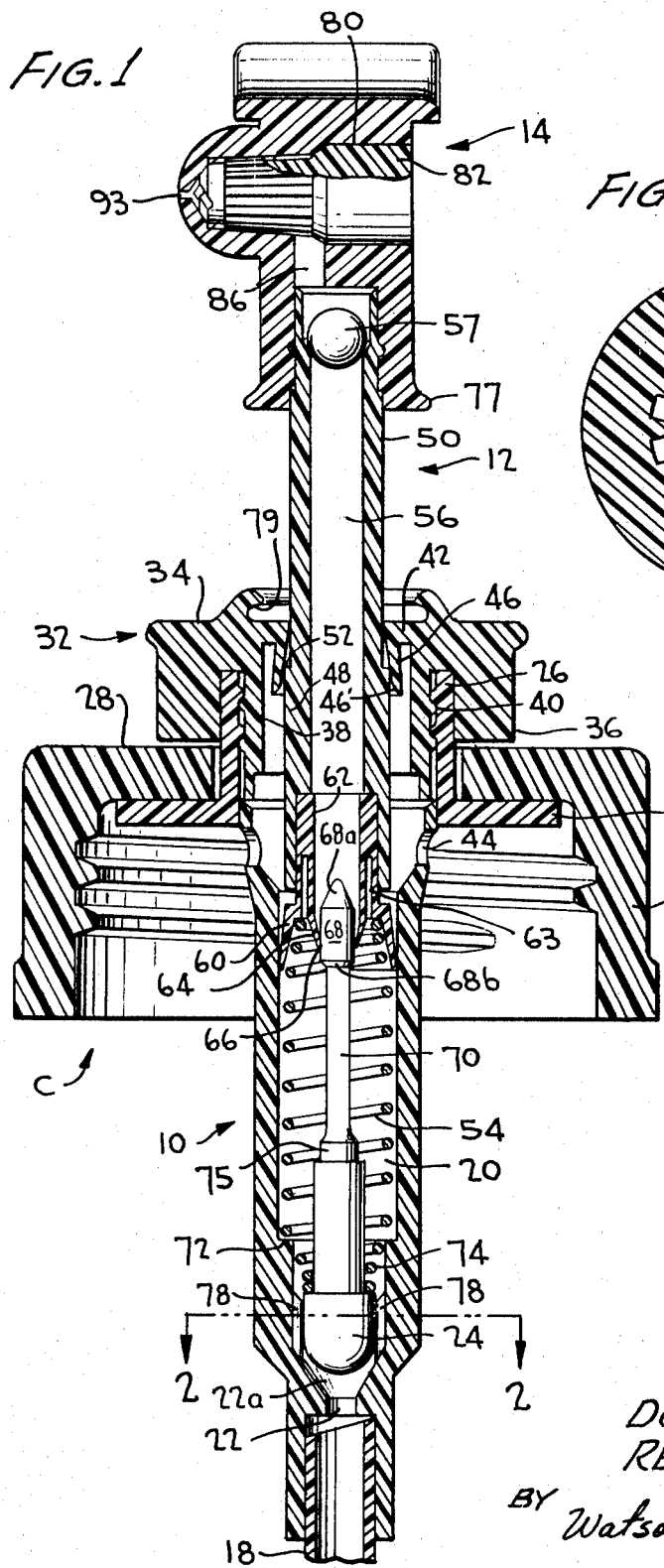
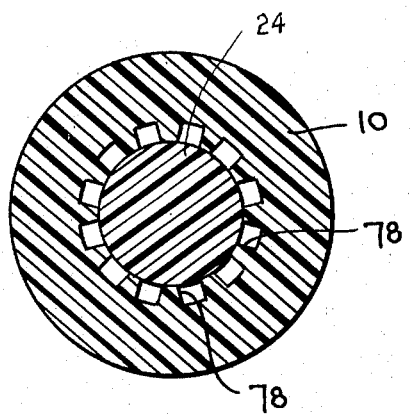
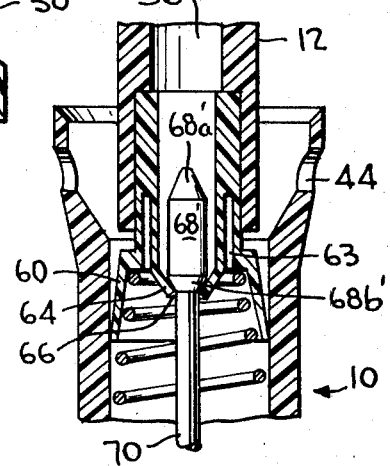
INVENTORS,
DOUGLAS F. CORSETTE
REX C. COOPRIDER
BY Watson, Cole, Grindle & Watson
ATTORNEYS United States Patent Office 3,391,647
Patented July 9, 1968

3,391,647
LIQUID DISPENSING PUMP
Douglas F. Corsette and Rex C. Cooprider, Los Angeles,
Calif., assignors to Calmar, Inc., City of Industry, Calif.,
a corporation of California
Filed Jan. 30, 1967, Ser. No. 612,402
15 Claims. (Cl. 103—188)

ABSTRACT OF THE DISCLOSURE

A sealing valve means for a container-mounted liquid dispensing pump of the reciprocating type in which seals are automatically established and maintained incident to spring projection of the plunger to its fully-raised position. The seals herein referred to are identified as an external seal for preventing leakage around the plunger and through the upper end of the pump cylinder and an internal seal for preventing leakage internally through the plunger by way of its discharge passage, all for the primary purpose of preventing leakage of the liquid contents of the container in the event some is wholly or partially inverted or is roughly handled during shipping and between periods of use.

---

In accordance with the present invention, the external seal comprises coacting valve parts carried by the cylinder and by the plunger respectively for relative axial movement into and from sealing engagement. One of the parts is deformable in a radial plane for conforming sealing engagement with the other cooperating part of the external seal to effect a fluid-tight seal throughout a substantial range of axial positions of the plunger. Accordingly, it is made possible to eliminate the difficulty heretofore encountered in accurately establishing the seal precisely in the position at which the upward plunger movement is arrested. In addition, the coaction between the said parts, and thus the parts themselves, may be relied upon to limit the upward movement of the plunger at the end of its suction stroke and thus to prevent accidental withdrawal of the plunger from the upper end of the cylinder.

Further, the invention includes, in combination with the external sealing valve means aforementioned, an internal sealing valve means through which the plunger passage is efficiently sealed throughout a range of plunger positions which is at least coextensive with and inclusive of the range of positions in which the exterior seal is established, thus insuring the establishment and maintenance of both seals throughout a substantial range of varying plunger positions. This eliminates the necessity for precise positioning and dimensioning of the cooperating valve parts of both seals relative to each other as well as to a separate plunger stop or limiting means. This permits a shifting or variation of the position in which the upward stroke of the plunger is terminated, as may occur incident to gradual wear of the cooperating parts of the external valve structure or as may be necessary to compensate for tolerances in the dimensions of the components of different pumps.

Thus, the instant invention makes possible the avoidance of the difficulties inherent in prior pumps of similar type employing various forms and arrangements of interior and exterior seals.

In addition to the inventive combinations, features, and concepts above outlined, there are disclosed and claimed herein preferred forms of specific sealing valve means which incorporate specific inventive features. In particular, the exterior seal in its preferred form is defined by a resiliently-deformable or flexible means defining a conically-tapering valve seat or sealing surface around the plunger, in combination with a valve body portion of the plunger which is formed to make line sealing contact only with such surface. The tapered conformation of the seating surface and its deformability or radial flexibility, in combination with the line contact therewith of the cooperating valve body, permits efficient use of a relatively small plunger raising force at a substantial mechanical advantage for establishing efficient sealing engagement between the cooperating valve parts, including any radial deformation of the sealing surface necessary to cause it to conform to the valve body along its line of contact therewith.

The internal seal similarly incorporates a specifically novel structure, including means defining an elastically-expansible valve port or seat in the discharge passage of the plunger, in combination with a cylindrical valve body carried by a valve stem extending axially through the valve port, the valve body being of greater diameter than the port to expand the latter and thus to attain a radial sealing pressure therewith throughout a wide range of relative axial positions of the valve body end and its cooperating port. The aforesaid resilient or elastic expansion of the valve port also is achieved by an axially conically-tapered portion of the valve body to thus utilize the plunger raising force at a mechanical advantage, but is positioned to utilize such force at a time when it is not required for seating the external-sealing valve body.

In a modified form of the internal sealing structure, the above referred to valve body is so arranged that it, when seated, abuts axially against the plunger and in effect establishes a positive coupling between the plunger and the inlet valve during any subsequent upward movement of the plunger. In order to permit such subsequent plunger movement as may be necessary to perfect the external seal, means is provided for resiliently opposing upward movement of the inlet valve body when thus coupled to the plunger for maintaining the valve body resiliently seated, but with a yielding force less than the thrust of the plunger spring. In accordance with the invention, such means may constitute a relatively weak lower end portion or extension of the plunger spring extending below its seat in the cylinder for engagement with the inlet valve to resiliently limit the unseating movement thereof and to yieldingly oppose such unseating movement during the establishment of the above-mentioned internal and external seals but with a force which is considerably less than the expansive force or thrust exerted at that time by the plunger spring for raising the plunger.

In order to prevent a liquid block, precluding initial downward movement of the plunger, an air cushion or its equivalent is provided to insure that the internal seal just described may readily be broken as the plunger is moved downwardly from its uppermost position.

Also, the preferred form of the invention includes a novel arrangement of the pump inlet valve in which the pump inlet valve and the internal sealing valve body are carried by a common valve stem and in which engagement of the sealing valve with its seat in the plunger effects a frictional coupling between the plunger and inlet valve for the purpose of seating the latter at the inception of each compression stroke of the plunger and in which the valve seat or port defining means further is arranged to exert a positive axial thrust and seating force on the inlet valve for seating the same at the conclusion of each compression stroke. Thus, there is made available a further internal seal which may be maintained operative as long as the plunger is depressed. In order to render effective the last described internal seal, means is provided to retain the plunger in its depressed position and to effect concurrently a further seal to preclude leakage externally of the depressed plunger.

Further, the invention contemplates facilitating the assembly of the pump structure by so forming the inlet valve and its cooperating portions of the pump cylinder that, when the valve is dropped into the cylinder incident to assembly, its stem will be maintained in axial alignment with the cylinder for reception in the discharge passage of the subsequently-inserted plunger, following which the cylinder and closure or guide may be applied around the plunger and press fitted, snap fitted, or otherwise secured to the upper end of the cylinder to secure the several pump parts in their operative positions and also to position the pump cylinder through a centrally-apertured container cap, the top wall of which is held between a radial flange around the upper end of the cylinder and the lower surface of the guide.

It is, of course, contemplated that a spray head will be mounted on the upper end of the plunger. Such a spray head conventionally comprises a generally-cylindrical socket having a discharge orifice opening centrally into one end thereof and having around the inner end of said orifice a circular swirl chamber into which liquid from the plunger is tangentially conveyed by swirl passages, the outer ends of which communicate in suitable manner with the plunger discharge passage.

Description of the invention

The accompanying drawing and following detailed description are exemplary only, for the purpose of disclosing what is presently contemplated as the best mode of carrying out the invention. This, of course, involves details which may be omitted or changed, as those skilled in the art will understand, without departing from the invention.

In the accompanying drawing:

FIGURE 1 is an enlarged axial sectional view through a pump embodying the invention, but showing part only of the depending dip tube;

FIGURE 2 is a section on the line 2—2 of FIGURE 1; and

FIGURE 3 is a fragmentary sectional view through a modified form of pump, taken in the same plane as FIGURE 1.

Referring in detail to the accompanying drawing, the preferred embodiment of the invention illustrated therein comprises a pump cylinder 10 within which a pump plunger 12 is disposed for reciprocation by intermittent finger pressure applied to a discharge head 14 at the outer end of the plunger. In order to adapt the pump structure for application to and use with a conventional liquid container for dispensing purposes, the pump cylinder 10 is provided with a radial supporting flange 16 adapted to rest on the upper end of a container neck (not shown) to support the pump in usual manner with its cylinder 10 depending into the container interior to withdraw the liquid contents thereof through a conventional dip tube 18 communicating with the lower end of the pump chamber 20 through an inlet port 22 under the control of the inlet valve 24.

Affixed to the upper end of the pump cylinder 10 is an enlarged diameter portion or extension 26, preferably constituting an integral portion thereof, which projects upwardly through a conformingly-spaced opening in the upper wall 28 of a container cap C having an internally-threaded skirt 30 for threaded engagement with the container neck. The flange 16 extends outwardly beneath the top wall 28 of the container cap C so as to be clamped by it against the end of the container neck to firmly secure the cylinder in place. The cylinder 10 and flange 16 may be integrally formed preferably of a plastic material having sufficient resiliency as to enable the flange 16 to function as a gasket in liquid-tight engagement with the container around its opening. The enlargement or axial extension 26 at the upper end of the pump cylinder preferably projects somewhat above the upper surface 28 of the container closure while the plunger 12 projects upwardly and is reciprocable through this upper end of the cylinder.

For closing the upper end of the cylinder and providing a guide for the plunger, there is secured on the cylinder, as part thereof, a combined guide bearing and cylinder closure or collar 32 having an upper end wall 34 of annular configuration disposed around and slidably receiving the plunger, and functioning as a retainer to prevent complete withdrawal of the plunger from the cylinder.

Since the container cap C is preferably assembled with the pump structure prior to the combining of both with the filled container, it is desirable to provide for interconnecting the container cap and the pump structure as a unit, for which purpose the collar 32 is provided with a skirt portion 36 projecting radially outwardly above the top of the container cap C to sandwich said container cap top between the collar 32 and flange 16.

To enable the guide 32 to withstand axial dislodging forces better, it is desirable also to provide same with a depending inner skirt 38 spaced inwardly of and concentrically to the outer skirt 36 for reception of the cylinder end 26 between the two skirts 36 and 38. Skirt 38 may be firmly secured within cylinder end 26 by means of annular snap rings such as 40.

As also mentioned earlier, the cylinder end closure 32 surrounds the plunger stem and has a bearing or guide portion exemplified by the annular radially inwardly-projecting ledge 42, the inner periphery of which is in loose sliding engagement with the plunger stem 50, though having sufficient clearance therewith throughout the major portion of the plunger stroke as to permit the passage of air or fluid between the plunger and the said bearing 42. By means of conventional vent or breather openings 44 in the cylinder wall just beneath the flange 16, the container interior is enabled to communicate with the atmosphere. It will be apparent that the path of communication extends through the vent or breather openings 44 in the upper end portion of the cylinder and outwardly between the plunger and its surrounding guide portion 42.

In accordance with an important aspect of the invention, the cylinder end closure or guide 32 is of a suitable deformable, preferably elastomeric, material such as rubber, polyethylene, or the like, and is provided with a depending sealing sleeve or skirt 46 which encircles the plunger, with its upper axial end integrally connected to the overhanging ledge or bearing 42. The sleeve 46 is in inwardly-spaced relation from the inner skirt 38, so as to be free for radial deformation and/or expansion.

The inner surface of the skirt is of generally frusto-conical configuration, diverging downwardly and outwardly from the plunger toward its free depending end, and the skirt itself preferably tapers in such a manner as to decrease in thickness and therefore to have increased flexibility toward its free end edge, adjoining which it is preferably rounded or flared, as shown, for camming engagement with the cooperating valve body portion 48 of the plunger 50. The radial clearance between the skirt or sleeve 46 and the collar skirt 38 provides room for radial flexing and/or expansion of the sleeve under the action of the cooperating valve body portion 48 of the plunger. Such valve body portion is here shown as an enlarged diameter section of the tubular plunger rod 50 of cylindrical conformation, thus to define around its juncture with the plunger rod 50 an annular upwardly-presented radial shoulder which intersects the cylindrical outer surface of the body portion 48 to define a comparatively abrupt circular edge 52 presented toward the internal conical sealing surface 46′ of sleeve 46 and of sufficiently small diameter to permit its initial reception within the lower end of the valve sleeve 46 and thereafter to make sealing line engagement with the internal sealing surface 46′ of said sleeve. It will be noted that the valve portion is so conformed that only its circular edge 52 will engage the sealing surface 46′.

Since the plunger 12 will normally be projected outwardly by a spring 54, after each compression stroke and at determination of its use, such projection of the plunger will automatically interengage the edge 52 and sleeve 46 to provide an external seal around the plunger. Thus, in the event the container is inverted or roughly handled during shipping or between periods of use, the liquid contents of the container, though free to enter the upper end of the cylinder through the breather openings 44, still cannot leak out between the plunger and the surrounding collar or cylinder closure 32.

The conical sealing surface 46' is at an acute angle to the axis of the plunger and cylinder to employ the lifting force of the spring 54 on the plunger 12 at a mechanical advantage which will increase as the angle is decreased. At the same time, the angle must be maintained of sufficient magnitude to avoid binding engagement of the sleeve 46 and valve portion 48.

It is further an important aspect of the invention that the cooperating valve sleeve or seat 46 and valve body portion or body 48, in addition to establishing the external seal above mentioned, may also function as the sole means for limiting the upward movement of the plunger on its return stroke. Thus, the valve body portion 48 of the plunger has an external diameter sufficiently large to prevent withdrawal of the plunger upwardly through the guide opening in collar 32. Nevertheless, the plunger is free to move upwardly to the extent necessary to establish such external seal and to provide such increasing degree of upward movement as may be necessary to take up wear in the cooperating seal-establishing members.

In addition to such external seal, there is automatically established an internal seal to prevent escape of liquid upwardly from the pump chamber 20 through the discharge passage 56 of the hollow plunger when the latter is projected by the spring 54 to its raised position. For establishing such an internal seal, the piston portion 60 of the plunger is molded or otherwise formed of a suitable elastomeric material, preferably separate from the plunger rod 50 which may be of more rigid material, and has a tubular connecting portion 62 press fitted into or otherwise secured to the lower end of the plunger and having a continuation therethrough of the plunger discharge passage 56. The piston 60 itself is preferably of inverted, and generally cuplike configuration, with the lower edges of its downwardly-flaring skirt in snug sliding sealing engagement with the interior wall of the cylinder. Depending from the piston is a tubular and integrally formed sleeve 64 aligned with and defining a downward extension of the discharge passage 56. The sleeve 64 is of frusto-conical downwardly-converging formation to have a constricted though elastically-expansible port or lower periphery 66 which functions both as a valve seat for the internal sealing valve 68 as well as in cooperation with the valve 68 to establish a frictional coupling through said valve 68 and the inlet valve stem 70 to the inlet valve 24. The valve body portion 68 is provided at its opposite ends with oppositely conically tapered pilot portions 68a and 68b, the former for facilitating its initial insertion through port 66 during assembly of the pump, and the latter for radially expanding the port to permit reception therein of the body portion 68. The taper of pilot portion 68b may be such as to apply the thrusting force of the spring 54 at a mechanical advantage, and its axial location will preferably be such that it will have passed through the port 66 before the circular sealing edge 52 of the plunger fully engages the sealing surface 46' of sleeve 46. Thus, the spring is relieved from having to exert simultaneously the maximum forces required for actuating both seals.

It is to be noted that the inlet valve 24, together with its stem 70 and the internal sealing valve 68, are of integral and preferably rigid plastic construction. The valve stem 70, for a substantial distance beneath the valve plug or body 68, is of appreciably smaller diameter than either the valve or valve plug 68 on the valve seat 66 so that, as the plunger moves downwardly to displace the internal sealing seat 66 from the valve 68 and downwardly about the relatively smaller diameter stem 70, liquid entrapped within the pump chamber 20 will be permitted to flow upwardly into and through the discharge passage 56 of the plunger between the port 66 and of that passage and the valve 68. Further, it should be borne in mind that the valve 68, though preferably of somewhat larger diameter than that of the constricted mouth 66 of the discharge passage, is of substantially smaller diameter than the portion of said passage in which the valve 68 is received when unseated, so as not to obstruct the flow of fluid upwardly therethrough. The valve 68 and the port or valve seat 66 are relatively positioned so that the valve is snugly received and seated in the port 66 as the plunger approaches the upper limit of its suction stroke. The generally cylindrical valve or valve body portion 68 is slidable through the cooperating seat or port 66, and its location and axial extent is such that it will sealingly engage the port 66 throughout a range of plunger movement which is at least coextensive with the range throughout which the exterior sealing members 46 and 48 may be in sealing engagement. Preferably, the axial position of the body portion 68 is selected so that establishment of the internal seal, by coaction of its members 66 and 68, will permit such subsequent axial movement of the plunger thereafter as may be necessary to establish the external seal between elements 46, 52.

While valve body 68 is preferably cylindrical, a slight taper, providing a slight increase in diameter toward its upper end, is also contemplated and is embraced within the term "generally cylindrical" as used herein.

Contributing further to the proper establishment of both the internal and external seals is the fact that the interconnected inlet and sealing valves 24 and 68 are permitted a certain amount of upward movement with the plunger over and above the normal unseating movement required for operation of the inlet valve 24. Thus, it will be seen that the plunger spring 54, which has its opposite operative extremities compressed between the lower face of the piston 60 and an annular ledge 72 within the cylinder also is provided with an integral reduced diameter downward extension 74, the lowermost coil of which is normally positioned to engage the inlet valve 24, and in effect to resiliently connect same to the cylinder, only after the inlet valve has been fully unseated from its conical valve seat 22a around the inlet port 22.

The resiliently expansible valve seat or extension 66 of the plunger cooperates with the inlet valve 24 by establishing a frictional connection therewith through the valve stem 70 and body 68 at the upper end of the plunger stroke for seating the inlet valve at the inception of each downward plunger stroke without reliance upon the action of gravity and thus without regard to whether or not the pump is inverted or upright. Such frictional coupling will cause the entire valve structure 68, 70, 24 to move downwardly with the plunger until the inlet valve 24 is seated, whereupon the frictional coupling will be released simultaneously with opening of the plunger discharge passage so that liquid may be discharged upwardly from the pump throughout the balance of the compression stroke. Thus, there is provided a positive means for freeing the inlet valve should it become stuck in unseated position due to lack of use for an extended period, or to the qualities of the liquids with which the pump is used.

If desired, the inlet valve stem 70 may be provided with a further valve portion 75 of enlarged diameter for sealing engagement by the valve seat 66 each time the plunger reaches the end of its downward or compression stroke, thereby sealing the discharge passage. In order to retain the plunger in its fully depressed position, and to seal against leakage externally of the plunger, the lower end of the depending skirt of the spray head is provided with an annular bead 77 dimensioned for reception within an annular collar 79 formed on the upper end wall 34 of the guide 32. When the bead 77 is snapped into collar 79, the action of spring 54 exerts the necessary pressure to effect sealing without, however, dislodging the bead from beneath the collar.

By this means the sprayer may be sealed and the plunger locked in its lowermost position for shipment, thus minimizing the risk of breakage and reducing the over-all height of the unit. To render the sprayer operable, the plunger is lifted manually to release bead 77 from collar 79. It will be appreciated that the features just described do not interfere in any way with normal pump operation.

Thus it will be readily apparent that, after each use of the dispensing pump of the invention in normal operation, the plunger spring 54, on returning the plunger to its fully projected position, will automatically establish the internal seal provided through operative interengagement of the valve 68 in the port 66 of the plunger discharge passage. The cylindrical configuration of the valve body 68 will permit continued upward movement of the plunger thereafter without affecting the operativeness of the internal seal and to whatever extent is necessary to permit sealing reception of the valve element 52 of the plunger in the seat provided by the tapered sealing sleeve 46. When the interengagement of the sleeve 46 and valve element 52 is relied upon as the sole means for limiting the upward projection of the plunger, it will be apparent that the plunger is always permitted sufficient upward projection movement to establish both the internal and external seals without necessity for the positions of the seal defining components of the respective seals to be so closely coordinated as to render them simultaneously established in a given plunger position, nor is it necessary that either seal be established simultaneously with the arrival of the plunger at a given stop position.

The portion 62 of the piston may be provided with an annular recess 63, closed at its upper end and communicating at its lower end with the interior of cylinder 20. Air becomes entrapped in the recess 63 during operation of the pump, and this air is compressed on initial downward movement of pump plunger 20, expanding again on the upward or suction stroke of the plunger. This air, supplemented by flexure of the walls defining the recess, acts as a cushion to permit the plunger to move downwardly, on initiation of the compression stroke, to an extent sufficient to permit the breaking of the seal between valve 68 and its cooperating valve seat or port 66, thus opening the discharge passage. In the absence of this or an equivalent precaution, it is found that the liquid, completely filling the pump cylinder below the piston, occasionally acts to block any significant initial downward movement of the piston and plunger, due to the efficiency of the seal at 66–68, thus preventing opening of the discharge passage and precluding normal pump operation.

It is to be noted that, in the preferred arrangement illustrated wherein the comparatively thin, flexible sealing sleeve 46 is wholly disposed within and surrounded by the skirts 36 and/or 38 of the molded collar 32, it will be protected thereby against injury at the time of being ejected from the mold into a bin of similar parts and thereafter during subsequent handling and assembly. Also, the particular arrangement of parts as above described is such as to particularly facilitate the assembly of the pump and to minimize the number of parts to be assembled. Thus, referring jointly to FIGURES 1 and 2 of the drawings, the inlet valve 24, though of hemispherical configuration at its lower end, is of generally cylindrical configuration elsewhere for coaction with an annular series of axial ribs or ridges 78 formed integrally with and around the reduced diameter lower end portion of the cylinder to form a valve cage. The cylindrically arranged ribs 78 are thus positioned to receive and engage the cylindrical portion of the inlet valve and to support same and its stem 70 in axial alignment in the cylinder when the valve is inserted or dropped into the open end of the cylinder during assembly. The spring 54 may similarly be disposed in the cylinder about the valve stem, and both the valve and spring will be maintained in an upright position coincident with the axis of the cylinder so that the valve body portion 68 at the upper extremity of valve stem 70 is properly centered for reception in the mouth 66 of the plunger passage when the plunger is then inserted into the cylinder. The parts may then be secured and retained in their assembled relation by application of the snap fitting end closure or collar 32 to the cylinder and about the plunger prior to the placing of the discharge head 14 on the outer end of the plunger. The usual ball check valve 57 in the plunger discharge passage is sufficiently displaced from the internal sealing valve 68 as to avoid interference between the two valves.

The plunger discharge head may be of any conventional type, and the details thereof form no part of the instant invention. In the accompanying drawing it is shown as a spray head 14 having the structure of that illustrated in the patent to Stewart and Cooprider, No. 2,374,880, granted Mar. 14, 1961, and therein fully described. Thus the spray head need comprise but two parts, namely, a casing having a bore 80 therethrough terminating in a discharge orifice 93 and an insert 82 which is preferably press fitted into the bore 80 through the open end thereof and which, when assembled in the casing, functions jointly with the casing to define the several interconnected chambers and passageways for delivering the fluid to and through the discharge orifice 93 with a swirling motion. The said two parts are adapted for economical mass production by injection moulding of plastics as well as by other methods and from other materials. The spray head may be mounted on the upper end of plunger 12 in conventional manner and is in communication with the interior of the plunger through passage 86.

In the modified form of the invention shown in FIGURE 3, the parts correspond fully in their construction and operation to the parts heretofore shown and described in connection with the embodiment shown in FIGURES 1 and 2, except as to certain details of the external seal and of the plunger spring, or as more fully hereinafter described. Accordingly, the various parts shown in FIGURE 3 are designated by reference characters similar to those employed in the preceding embodiment except as to the specific portions thereof which are modified. These latter portions are designated by reference characters which correspond to the reference characters of the preceding embodiment but which are primed.

Thus, in FIGURE 3, the sealing valve or valve body 68' is so formed and disposed that its annular downwardly-directed shoulder 68b' is adapted for axial abutting sealing engagement with the upwardly-presented internal conical face of the plunger around the discharge port 66. To this end, the external diameter of the cylinder body 68', the elasticity of the seat 66, and/or the strength of the plunger spring extension 74 are so interrelated that the seating of the valve body annular shoulder 68b' around and over the valve port 66 establishes a positive coupling between the plunger 12 and the valve body 68'.

It is important to the operation of this form of the invention that, after the valve body 68' thus engages the valve port or seat 66 of the plunger, it may move upward with the plunger responsive to the upward resilient thrust of the main portion of the plunger spring 54 until the external seal is fully established by engagement of the circular sealing edge 52 of the plunger in sealing relation with the inner surface of the sleeve 46 of the collar.

In order that such continued upward movement of the plunger may continue after seating of the valve body 68', the lower end extension 74 of the plunger spring may be formed in any of various known ways to be substantially weaker than the plunger spring proper 54. The difference in strengths between the respective spring portions 54 and 74 is chosen such that the thrust of the main portion 54 of the spring, as it approaches the upper end of the plunger stroke, sufficiently exceeds the strength or resilient thrust of the spring extension 74 that the latter is yieldably axially compressed and overpowered by the thrust of the main spring portion 54 due to the positive coupling afforded between the lower end extremity of the spring extension 74 and the plunger, by the seated valve body 68, valve stem 70, and inlet valve 24. It will be apparent, of course, that the lowermost coil or convolution of the relatively larger diameter main spring portion 54 will at all times remain seated on and thrusting against its annular spring seat 72 within the cylinder and that the lower end extension 74, by virtue of its connection to this lowermost stationary or seated coil of the spring portion 54, will be secured against bodily upward displacement, whereby the spring extension 74 may be compressed between the inlet valve 24 and its connection to the spring portion 54. The differences in strength or expansive forces of the respective spring portions 54 and 74 may be provided here by forming the extension 74 of appreciably smaller pitch than the spring portion 54 or by forming its coils of relatively-reduced diameter as contrasted to those of the main spring portion 54, or in other ways which will be readily apparent to persons skilled in the art.

Thus, it will be understood that the operation of a dispensing pump incorporating the modified features of FIGURE 3 will be similar in all respects to that of the preferred embodiment except that, as the plunger approaches the upper limit of its suction stroke under the expansive force of its spring 54, the lower end of the depending spring extension 74 will engage the inlet valve 24 substantially at or just before the valve body 68 is seated against and in axial abutment with the inner conical surface of the plunger 64 around the discharge port 66. The valve body 68, after being thus seated, may continue to move upwardly with the plunger under the thrust of the main spring portion 54 to such extent, if any, as may be necessary thereafter to establish sealing engagement between the external seal members 52 and 46.

In this application, we have shown and described only the preferred embodiments of the invention by way of illustration of the preferred mode of practicing the invention. However, it will be recognized that the invention is capable of other and different embodiments and also is subject to variation and/or omission of various of its specific details without departing from the invention as defined in the accompanying claims.

Having thus described our invention, we claim:

1. In a reciprocating liquid dispensing pump, including a hollow cylinder open at its upper axial end and formed with an axially directed inlet port through its lower axial end, an inlet valve disposed for axial seating and unseating movement relative to the inlet port to permit inflow only of liquid into said cylinder, a plunger having a piston thereon disposed for reciprocation in said cylinder to define a variable volume pump chamber between said piston and the lower end of the cylinder, said plunger comprising a plunger rod projecting outwardly through the open upper end of the cylinder for application of finger pressure thereto, said cylinder including an annular collar at its upper end encircling said plunger rod, with the inner periphery of the collar defining a loosely fitting guide bearing for the plunger rod, adapted to permit fluid flow between the said rod and guide bearing, there being a return spring interconnected between said plunger and cylinder for resiliently projecting the plunger outwardly on its suction stroke, said plunger having a discharge passage extending axially through said piston and plunger rod, and check valve means in said passage for preventing return flow of liquid through said passage toward the pump chamber, the improvement wherein said collar includes a portion of resiliently deformable material defining a central downwardly diverging conical sealing surface around the plunger rod below said guide bearing, the plunger further including a valve body portion having radially and axially presented exterior surfaces intersecting each other along a sharply defined circular line of intersection of a radius intermediate the maximum and minimum radii of the sealing surface for annular line sealing engagement with said sealing surface, the resilient deformability of the material defining said surface and the line engagement thereof by the valve body portion facilitating deformation of the surface as necessary to compensate for irregularities in the interengaging portions of the surface and the valve body to effect an efficient fluid-tight seal under the action of said return spring, whereby to permit a gradual increase in the upper limit of the said stroke for taking up wear on the respective parts while still establishing a fluid-tight external seal between the plunger and cylinder.

2. In a reciprocating liquid dispensing pump as defined in claim 1, the further improvement wherein the said conical sealing surface is defined by a sleeve of resilient elastomeric material integrally connected with the collar near the convergent end of the sleeve, the sleeve having a depending free end spaced radially inwardly from and free for radial expansion toward any surrounding portions of said collar and cylinder under the wedging and expanding action of said sealing valve body.

3. In a reciprocating liquid dispensing pump as defined in claim 2, the further improvement wherein said sleeve is of gradually diminishing radial thickness toward its free end whereby to provide increased flexibility and expansibility of the sleeve adjacent the free end to more readily conform to and sealingly engage the cooperating valve body portion under the action of the return spring pressure on said plunger.

4. In the combination defined in claim 1, the further improvements wherein said pump includes means for arresting the unseating movement of said inlet valve during the inception of the upward plunger stroke, the inlet valve including a rigid valve stem projecting upward axially through the pump chamber, and interior seal defining means for said plunger discharge passage comprising a resiliently radially expansible valve sleeve connected to the plunger in communication with the discharge passage, said sleeve having a free elastically expansible end directed toward the pump chamber and constituting an annular valve seat, said inlet valve stem being freely movable through said annular valve seat into the discharge passage during reciprocation of the plunger and cooperating with said annular valve seat to define therebetween a flow passage for liquid from the pump chamber into the discharge passage, and a generally cylindrical valve body carried by said stem in position for sealing reception in said annular valve seat throughout a substantial range of axial positions of the plunger at the end of its suction stroke, said range of positions being coextensive at least with the range of possible sealing positions of the external seal between the plunger and cylinder.

5. In the combination defined in claim 4, the further improvement wherein said last mentioned sealing valve has a diameter in excess of that of the cooperating annular valve seat, and said valve further includes an upwardly tapered pilot portion for facilitating its entry into said seat whereby to elastically expand the latter, the expanded condition and flexibility of the said annular valve seat enabling it to snugly conformingly engage its cooperating valve body throughout the said range of movement of the latter and despite irregularities in the generally cylindrical surface of the valve body.

6. In a liquid dispensing pump of the class including a plunger disposed for reciprocation in and through the open end of a pump cylinder under the action of intermittently applied finger pressure for depressing the plunger on its compression stroke and of a return spring for projecting the plunger upwardly on its suction stroke, wherein said pump is provided with means actuated at the end of each suction stroke for establishing internal and external seals respectively through the discharge passage of the plunger and exteriorly around the plunger between it and said cylinder adjacent the open end of the cylinder; the improvement wherein said internal seal comprises means carried by the plunger defining a resiliently radially expansible valve port in the plunger discharge passage, a sealing valve body and means connected to the cylinder for supporting said sealing valve body in the plunger discharge passage for sealing reception in said port in the fully raised position of the plunger, said valve body being generally cylindrical and of greater diameter than the port to radially expand said port and to maintain a constant resilient radial sealing pressure between the periphery of the resiliently expanded port and the sealing valve body throughout a substantial range of relative axial movement of the said port and valve body, the valve body including a conically tapered pilot portion for facilitating its entry into and expansion of the said port, and said external seal comprising an annular collar secured over the open upper end of the cylinder in fluid-tight relation thereto, said collar encircling the plunger and including a flexible sleeve having a free end portion depending into the cylinder, the inner periphery of said sleeve defining a downwardly diverging conical sealing surface around the plunger and radially spaced from the plunger at its diverging lower end, said plunger including a valve portion of circular cross-section encircling and projecting outwardly therefrom, said plunger valve portion being provided with an annular sealing edge directed toward said diverging end of said sealing surface for line sealing engagement with the said surface and being shaped to engage said surface only at said edge.

7. The combination of elements defined in claim 6, in which said external seal comprises the sole means for arresting upward movement of the plunger in the cylinder.

8. The combination defined in claim 7, in which said conical sealing surface is at an acute angle to the axis of the cylinder to utilize the pressure of said spring at a substantial mechanical advantage for establishing efficient line sealing engagement of said edge with said sealing surface and for achieving an incidental deformation of the said surface as necessary to achieve conformity thereof with the said edge.

9. The combination of claim 7, further including a liquid inlet port opening axially into the lower end of the cylinder and having an upwardly directed seat therearound, an inlet valve disposed for limited axial movement in the cylinder into and from sealing relation with said seat, said inlet valve including a rigid upwardly directed valve stem in axial alignment therewith, said valve stem supporting the said sealing valve body at its upper end and comprising said means connected to the cylinder for supporting said sealing valve body, said sealing valve body having a cylindrical wall portion concentric to the axis of the cylinder, said cylinder having a valve chamber at its lower end for reception of the inlet valve, and including an annular ledge above said chamber defining a seat for the lower end of the return spring, said return spring having a reduced diameter extension encircling the valve stem and extending into said chamber for resiliently limiting the unseating movement of the inlet valve, said chamber further being provided with a series of axially disposed radially inwardly projecting ribs arranged in circular formation concentrically to the axis of the cylinder and chamber for slidably supporting the inlet valve and its valve stem in coaxial centered relation with the cylinder, said inlet valve having a downwardly directed pilot portion for facilitating its initial reception within said ribs incident to assembly of the pump, said downwardly directed extension of the spring being guided into the said chamber together with the inlet valve, the inlet valve thus supporting the sealing valve body at the upper end of its stem in accurate position for reception in the radially expansible sealing valve port responsive to subsequent insertion of the plunger into the cylinder, said sealing valve body being provided with an upwardly converging conical pilot portion for expansion of the elastic sealing port to a radius large enough for accommodation of the said sealing valve body.

10. In a liquid dispensing pump of the class including a plunger disposed for reciprocation in and through the open end of a pump cylinder under the action of intermittently applied finger pressure for depressing the plunger on its compression stroke and of a return spring for projecting the plunger upwardly on its suction stroke, wherein said pump is provided with means actuated at the end of each suction stroke for establishing internal and external seals respectively through the discharge passage of the plunger and exteriorly around the plunger between it and said cylinder adjacent the open end of the cylinder; the improvement wherein said internal seal comprises means carried by the plunger defining a resiliently radially expansible valve port in the plunger discharge passage, a sealing valve body and means connected to the cylinder for supporting said sealing valve body in the plunger discharge passage for sealing reception in said port in the fully raised position of the plunger, said valve body being generally cylindrical and of greater diameter than the port to radially expand said port and to maintain a constant resilient radial sealing pressure between the periphery of the resiliently expanded port and the sealing valve body throughout a substantial range of relative axial movement of the said port and valve body, said plunger being formed to provide an expansion chamber accommodating sufficient liquid on initiation of downward movement of said plunger to permit release of said internal seal.

11. The combination of claim 10 in which said expansion chamber is positioned to entrap air therein during normal operation of said plunger, whereby the entrapped air is compressed on initiation of downward movement of said plunger to prevent the formation of a liquid block within said cylinder.

12. In a liquid dispensing pump of the class including a plunger disposed for reciprocation in and through the open end of a pump cylinder under the action of intermittently applied finger pressure for depressing the plunger on its compression stroke and of a return spring for projecting the plunger upwardly on its suction stroke, wherein said pump is provided with means actuated at the end of each compression stroke for establishing internal and external seals respectively through the discharge passage of the plunger and exteriorly around the plunger between it and said cylinder adjacent the open end of the cylinder; the improvement wherein said internal seal comprises means carried by the plunger defining a resiliently radially expansible valve port in the plunger discharge passage, a sealing valve body and means connected to the cylinder for supporting said sealing valve body in the plunger discharge passage for sealing reception in said port in the fully depressed position of the plunger, an annular collar secured over the open upper end of the cylinder, said collar encircling and forming a guide for said plunger, and means acting between said collar and said plunger in the fully depressed position of the latter to releasably retain the plunger in such position and to effect a seal against leakage of liquid externally of the plunger.

13. In the combination defined in claim 1, the further improvements wherein said pump includes means for arresting the unseating movement of said inlet valve during the inception of the upward plunger stroke, the inlet valve including a rigid valve stem projecting upward axially through the pump chamber, and interior seal defining means for said plunger discharge passage comprising a resiliently radially expansible valve sleeve connected to the plunger in communication with the discharge passage, said sleeve having a free elastically expansible end directed toward the pump chamber and constituting an annular valve seat, said inlet valve stem being freely movable through said annular valve seat into the discharge passage during reciprocation of the plunger and cooperating with said annular valve seat to define therebetween a flow passage for liquid from the pump chamber into the discharge passage, and a valve body carried by said stem and adapted for sealing engagement with said annular valve seat throughout a substantial range of axial positions of the plunger at the end of its suction stroke, said range of positions being coextensive at least with the range of possible sealing positions of the external seal between the plunger and cylinder.

14. The combination defined in claim 13, wherein said valve body is of generally cylindrical shape for movement into and partially through said annular valve seat in radial sealing engagement therewith.

15. The combination defined in claim 13, wherein said valve body is positioned for positive axial sealing abutment with said annular valve seat as the plunger approaches the end of its suction stroke under the force of said plunger return spring, and means for resiliently yieldably opposing the upward axial movement of said valve body together with the plunger, but with a force less than that exerted by the plunger return spring on the plunger.

References Cited

UNITED STATES PATENTS

| 3,044,413 | 7/1962 | Corsette | 103—178 |
| 3,228,347 | 1/1966 | Corsette | 103—188 |
| 3,237,571 | 1/1966 | Corsette | 103—188 |
| 3,248,021 | 4/1966 | Corsette et al. | 103—178 X |

WILLIAM L. FREEH, *Primary Examiner.*